United States Patent
Jia et al.

(10) Patent No.: US 12,253,280 B2
(45) Date of Patent: Mar. 18, 2025

(54) FRESH AIR CONDITIONING SYSTEM

(71) Applicant: Puresci Environmental Technology Co., Ltd, Wuxi (CN)

(72) Inventors: Dongxin Jia, Wuxi (CN); Tao Mei, Wuxi (CN)

(73) Assignee: PURESCI ENVIRONMENTAL TECHNOLOGY CO., LTD, Wuxi (CN)

( * ) Notice: Subject to any disclaimer, the term of this patent is extended or adjusted under 35 U.S.C. 154(b) by 428 days.

(21) Appl. No.: 17/840,630

(22) Filed: Jun. 15, 2022

(65) Prior Publication Data

US 2022/0381453 A1    Dec. 1, 2022

Related U.S. Application Data

(63) Continuation of application No. PCT/CN2021/124436, filed on Oct. 18, 2021.

(30) Foreign Application Priority Data

Jun. 1, 2021 (CN) .......................... 202110609972.0

(51) Int. Cl.
*F24F 3/14* (2006.01)
*B01D 53/26* (2006.01)
(Continued)

(52) U.S. Cl.
CPC .......... *F24F 3/1423* (2013.01); *B01D 53/261* (2013.01); *F24F 3/147* (2013.01);
(Continued)

(58) Field of Classification Search
None
See application file for complete search history.

(56) References Cited

U.S. PATENT DOCUMENTS

2005/0252229 A1    11/2005    Moratalla
2010/0307175 A1*   12/2010    Teige .................... F24F 3/1423
                                                           62/271

FOREIGN PATENT DOCUMENTS

CN    105674436 A    6/2016
CN    107388431 A    11/2017
(Continued)

OTHER PUBLICATIONS

English language machine translation for JP 4816267. Retrieved from translationportal.epo.org on Oct. 9, 2024. (Year: 2024).*

(Continued)

*Primary Examiner* — Jason M Greene
(74) *Attorney, Agent, or Firm* — Andrew C. Cheng

(57) ABSTRACT

A fresh air conditioning system includes a first cooling device having a first cooling end and a first heating end; a dehumidifying rotary defining a first section and a second section. An airflow switching device directs a fresh airflow toward the first cooling end or the first heating end, and then flows to the first section. A return airflow passes through a first heat exchanger, and conducts heat exchange with the other end of the first cooling device, and then flows to the second section. Or switching opposite ends of the first cooling device to selectively cool or heat, the fresh airflow conducts heat exchange with one end of the first cooling device, and then flows to the first section. The return airflow conducts heat exchange with the other end of the cooling device and then flows to the second section.

13 Claims, 4 Drawing Sheets

(51) Int. Cl.
　　　*F24F 3/147*　　　(2006.01)
　　　*F24F 13/28*　　　(2006.01)

(52) U.S. Cl.
　　　CPC ...... *F24F 13/28* (2013.01); *F24F 2003/1464* (2013.01); *F24F 2203/1032* (2013.01); *F24F 2203/104* (2013.01); *F24F 2203/108* (2013.01)

(56) References Cited

FOREIGN PATENT DOCUMENTS

| | | | |
|---|---|---|---|
| CN | 112146187 A | 12/2020 | |
| CN | 112648690 A | 4/2021 | |
| CN | 215001975 U | 12/2021 | |
| JP | 4816267 | * 9/2011 | ............ F24F 3/1423 |
| JP | 4816267 B2 | 11/2011 | |

OTHER PUBLICATIONS

The extended European Search Report of EP patent application No. 21904614.1 issued on Jul. 31, 2023.

* cited by examiner

FRESH AIR CONDITIONING SYSTEM

FIELD OF THE INVENTION

The present invention relates to air handling system, and particularly to a fresh air conditioning system.

BACKGROUND OF THE INVENTION

Typically, a dehumidifying rotary is commonly used to dehumidifying moisture contained in an airflow. The working principle behind the dehumidifying rotary is: when the dehumidifying rotary rotates, a portion of the dehumidifying rotary rotated into a processing zone is used to absorb the moisture. As a result, the humidity contained within the airflow reduced, and a drier airflow is attained. The dehumidifying rotary keeps on rotating, and the portion of the dehumidifying rotary which absorbs moisture is rotated to a regenerating zone in which hot and dried airflow will take away the moisture contained in the dehumidifying rotary. As a result, moisture-absorbing capacity of the dehumidifying rotary is rejuvenated/restored, and the dehumidifying rotary keeps rotating to the processing zone to absorb moisture, and repeatedly dehumidifying moisture contained in the airflow.

In order to increase the efficiency and performance of the dehumidifying rotary, the airflow is cooled before it enters the processing zone so as to increase the absorbing rate of the dehumidifying rotary, while the airflow enters the regenerating zone is warm up so as to increase the regenerating rate of the regenerating zone.

In recently years, the semiconductor technology has been incorporated into the dehumidifying rotary to cool down and warm up the airflow. The semiconductor used in this field is also called thermoelectric cooling device which utilizes the thermo-electric effect to get the cooling energy. A conductor is used to interconnect two different metals, and applied with DC power. As a result, temperature at one end decreases, and temperature at the other end increases.

Chinese Patent Publication No. CN112146187A discloses a novel rotary dehumidifier. The fresh airflow passes a heat exchanger and indirectly conducts heat exchange with a cooling end of a thermoelectric cooler. After the fresh airflow is cooled down, the fresh airflow flows to a processing zone of the dehumidifying rotary. The fresh airflow becomes drier after the moisture is absorbed. The temperature of the return airflow increases after it passes the heat exchanger and conducts heat exchange with a heating end of the thermoelectric cooling device. Then the return airflow flows to the regenerating zone of the dehumidifying rotary, absorbing moisture contained within the dehumidifying rotary and eventually is blown out from the system. The device utilizes the combination of the dehumidifying rotary and the thermoelectric cooler to achieve the goal of dehumidifying and temperature control. The device utilizes energy from both ends of the thermoelectric cooler. However, the device can't humidify the airflow. It features only a simple function.

Chinese Patent Publication CN107388431A discloses an integrated dehumidifying/humidifying cooling device and method. A bubble humidifier is incorporated to a semiconductor dehumidifying rotary to humidify the airflow. The airflow passes through the bubble humidifier to increase humidity rate after absorbing moisture contained therein. Similarly, the device utilizes the combination of the dehumidifying rotary and the semiconductor cooler to achieve the goal of dehumidifying and temperature control. In addition, the incorporation of the bubble humidifier helps to humidify the airflow passing therethrough. However, the humidifying process is achieved by incorporating the additional bubble humidifier and corresponding conduits which complicate the overall configuration.

SUMMARY OF THE INVENTION

The present invention provides a fresh air conditioning system which is integrated with two functions, i.e. controlling the temperature and dehumidifying moisture of the fresh airflow during the summer time, and controlling the temperature and humidifying the fresh airflow during the winter time. Energy from both ends of the cooling device is effectively utilized and effectively conserved.

The purposes can be achieved by the following technologies.

The present invention provides a fresh air conditioning system comprising:

a first cooling device, including a first cooling end and a first heating end; preferably, the first cooling end and/or the first heating end of the first cooling device comprising thermal conductive material configured to conduct heat exchange with fresh airflow; further preferably, the thermal conductive material being a thermal conductive aluminum sheet;

a dehumidifying rotary defining a first section and a second section, wherein when the first section works as a processing zone, then the second section works as a regenerating zone, wherein when the first section works as the regenerating zone, then the second section works as the processing zone; the processing zone being a zone in which the dehumidifying rotary absorbs moisture, and the regenerating zone being a zone in which the dehumidifying rotary losses moisture; the dehumidifying rotary including moisture-absorbing material, and the dehumidifying rotary rotating continuously such that the moisture-absorbing material of the dehumidifying rotary repeatedly passes through the first section and the second section;

an airflow switching device connected to the first cooling device and configured to selectively direct a fresh airflow from a first space to the first cooling end or the first heating end of the first cooling device;

a first heat exchanger connected to the second section of the dehumidifying rotary and configured to conduct a heat exchange with a return airflow from a second space; and a first energy switching device connected to the first cooling device and the first heat exchanger and configured to selectively transfer energy from the first cooling end or the first heating end to the first heat exchanger;

wherein the fresh airflow from the first space conducts heat exchange with the first cooling end or the first heating end of the first cooling device and then flows through the first section of the dehumidifying rotary to the second space, and the return airflow from the second space conducts a heat exchange with the first heat exchanger and then flows out through the second section of the dehumidifying rotary.

The working principle is: during the summer time, the fresh air conditioning system cools down the fresh airflow and reduces moisture of the fresh airflow. The fresh airflow from the first space is controlled by the airflow switching device and is directed to the first cooling end of the first cooling device. The temperature of the fresh airflow is cooled down after the fresh airflow conducts heat exchange with the first cooling end of the first cooling device. The temperature of the fresh airflow closes to the dew point and then the fresh airflow flows to the first section of the dehumidifying rotary. In this situation, the first section of the dehumidifying rotary is the processing zone, and the moisture of the fresh airflow, which temperature closes to the dew point, is absorbed by the dehumidifying rotary. The fresh airflow becomes drier and flows to the second space. The intended purpose for cooling down the fresh airflow and dehumidifies its moisture during the summer time is therefore achieved. The first energy switching device transfers energy from the first heating end of the first cooling device to the first heat exchanger. The temperature of return airflow from the second space increases after the return airflow conducts heat exchange with the first heat exchanger and then flows to the second section of the dehumidifying rotary. In this case, the second section of the dehumidifying rotary is the regenerating zone. The return airflow is blown out after the return airflow absorb moisture within the dehumidifying rotary. After moisture contained within the second section of the dehumidifying rotary is removed, moisture-absorbing capacity of a portion of the moisture-absorbing material restores and when the dehumidifying rotary rotates to the first section, the moisture-absorbing material absorbs moisture contained within the fresh airflow. As long as the dehumidifying rotary rotates, this process is continuously repeated.

During the winter time, the fresh air conditioning system functions to heat up the fresh airflow and humidifying moisture content of the fresh airflow. The fresh airflow from the first space is directed to the first heating end of the first cooling device by the airflow switching device. The temperature of the fresh airflow increases after the fresh airflow conducts heat exchange with the first heating end. Then the fresh airflow flows to the first section of the dehumidifying rotary. In this case, the first section of the dehumidifying rotary acts as the processing zone, the heated fresh airflow absorbs moisture within the dehumidifying rotary. The heated and wetted fresh airflow then flows into the second space. The intended purpose for warming up the fresh airflow and humidifying its moisture during the winter time is therefore achieved. The first energy switching device directs energy from the first cooling end of the first cooling device to the first heat exchanger. The temperature of the return airflow from the second space cools down after conducts heat exchange with the first heat exchanger. Afterward, the return airflow flows to the second section of the dehumidifying rotary. In this case, the second section of the dehumidifying rotary acts as the processing zone. The temperature of the return airflow closes to the dew point after it is cooled. The moisture contained within the return airflow is absorbed by the dehumidifying rotary and then is blown out. After the second section of the dehumidifying rotary absorbs moisture, the moisture-absorbing material contains abundant moisture. When the dehumidifying rotary rotates to the first section, moisture contained therein is transferred to the heated fresh airflow. As long as the dehumidifying rotary rotates, this process is continuously repeated.

Further, a fresh air conditioning system made in accordance with the present invention further comprises:

a second cooling device including a second cooling end and a second heating end, wherein the second cooling end is connected to the first section of the dehumidifying rotary, and after flowing through the first section of the dehumidifying rotary, the fresh airflow from the first space conducts heat exchange with the second cooling end of the second cooling device, and then flows to the second space; preferably, the second cooling end of the second cooling device comprising thermal conductive material configured to conduct heat exchange with fresh airflow; further preferably, the thermal conductive material being a thermal conductive aluminum sheet;

a second heat exchanger connected to the first heating end of the first cooling device and the second heating end of the second cooling device and the first section of the dehumidifying rotary, wherein the fresh airflow from the first space flows to the first section of the dehumidifying rotary after the fresh airflow completes heat exchange with the first heating end of the first cooling device and then with the second heat exchanger;

a second energy switching device connected to the second heating end of the second cooling device, the first heat exchanger and the second heat exchanger to selectively transfer energy from the second heating end of the second cooling device to the first heat exchanger or the second heat exchanger.

Preferably, the fresh air conditioning system made in accordance with the present invention further comprises one or more additional cooling devices, heat exchangers and energy switching devices.

The second cooling end of the second cooling device is capable of re-cooling the fresh airflow after the fresh airflow passes through the first section of the dehumidifying rotary, and further regulate the temperature of the fresh airflow, and the second heating end of the second cooling device can supply heat for the first heat exchanger or the second heat exchanger via the second energy switching device, which further enhances the processing capacity of the fresh air conditioning system.

Further, the first heat exchanger includes a ventilated plenum chamber and/or the second heat exchanger includes a ventilated plenum chamber. The ventilated plenum chamber is a three-pass configuration including a primary airway and an auxiliary airway. The primary airway is used for the fresh airflow or the return airflow, while the auxiliary airway is for influxing of heat exchanged airflow from the first cooling device or the second cooling device. The heat exchanged airflow conducts heat exchange with the fresh airflow or the return airflow within the primary airway.

Further, the second energy switching device includes a sixth conduit which is interconnected between the second heating end of the second cooling device and the second heat exchanger and is equipped with a sixth valve, and a seventh conduit which is interconnected between the second heating end of the second cooling device and the first heat exchanger and is equipped with a seventh valve.

The second heat exchanger is connected to the first section of the dehumidifying rotary with a third conduit which is equipped with a third valve.

Further, the fresh air conditioning system further comprises:

a first blower connected to the second cooling end of the second cooling device and configured to blow the fresh air to the second space after the fresh air completes heat exchange with the second cooling end of the second cooling device;

a second blower connected to the second section of the dehumidifying rotary and configured to expel the return airflow out from the second section of the dehumidifying rotary;

a heater connected to the second section of the dehumidifying rotary and the first heat exchanger, after the return airflow from the second space completes the heat exchange with the first heat exchanger, the return airflow flows through the heater and then to the second section of the dehumidifying rotary; and a filter connected to the airflow switching device, the fresh air from the first space flowing through the filter and then to the airflow switching device.

Further, the first cooling device and/or the second cooling device is a thermoelectric cooler. The thermoelectric cooler has advantages of no noise, no vibration, no refrigerant needed, small size, light weight, etc., and it is reliable, easy to operate, and easy to adjust the cooling capacity.

Further, the airflow switching device includes a first conduit connected to the first heating end of the first cooling device and equipped with a first valve, and a second conduit connected to the first cooling end of the first cooling device and equipped with a second valve.

Further, the first energy switching device includes a fourth conduit which is interconnected the first heating end of the first cooling device and the first heat exchanger and is equipped with a fourth valve, and a fifth conduit which is interconnected the first cooling end of the first cooling device and the first heat exchanger and is equipped with a fifth valve.

The present disclosure provides a fresh air conditioning system comprising:

a first cooling device including a first end and a second end, wherein when the first end works to cool, the second end works to heat, and wherein then the first end works to heat, the second end works to cool; preferably, the first heating end of the first cooling device comprising thermal conductive material configured to conduct heat exchange with fresh airflow; further preferably, the thermal conductive material being a thermal conductive aluminum sheet;

a dehumidifying rotary including a first section and a second section, wherein when the first section works as a processing zone, the second section works as a regenerating zone, and when the first section works as a regenerating zone, the second section works as a processing zone; the processing zone being a zone in which the dehumidifying rotary absorbs moisture, and the regenerating zone being a zone in which the dehumidifying rotary losses moisture; the dehumidifying rotary including moisture-absorbing material, and the dehumidifying rotary rotating continuously such that the moisture-absorbing material of the dehumidifying rotary repeatedly passes through the first section and the second section;

a first heat exchanger and a fourth conduit, wherein the first heat exchanger is connected to a second section of the dehumidifying rotary and configured to conduct heat exchange with a return airflow from a second space, and heat is transferred from the second end of the first cooling device to the first heat exchanger via the fourth conduit;

The fresh airflow from a first space flows to the second space through the first section of the dehumidifying rotary after conducting heat exchange with the first end of the first cooling device, and the return airflow from the second space discharges from the second section of the dehumidifying rotary after conducting heat exchange with the first heat exchanger.

The working principle is, during the summer time, the fresh airflow needs to be cooled down and dehumidify, and the first end of the first cooling device refrigerates, the temperature of the fresh airflow from the first space is cooled down after the fresh airflow conduct heat exchange with the first end. The temperature of the fresh airflow is cooled to the dew point, and then flows to the first section of the dehumidifying rotary. In this case, the first section of the dehumidifying rotary is the processing zone, the moisture contained within the fresh airflow, in which the temperature is close to the dew point, is absorbed by the dehumidifying rotary quickly and become drier. Then the fresh airflow flows into the second space. By this arrangement, the intended purposes of cooling down and dehumidifying the fresh airflow during the summer time are achieved. The second end of the first cooling device heats up, and energy therefrom is transferred to the first heat exchanger via the fourth conduit. The return airflow from the second space is warm up after the return airflow conducts heat exchange with the first heat exchanger. Then the return airflow flows to the second section of the dehumidifying rotary. In this case, the second section of the dehumidifying rotary is the regenerating zone. The heated return airflow absorbs moisture contained within the dehumidifying rotary and then exits the system. After moisture contained within the second section of the dehumidifying rotary is removed, portion of the moisture-absorbing material is reset and when the dehumidifying rotary rotates to the first section, the moisture-absorbing material absorbs moisture contained within the fresh airflow. As long as the dehumidifying rotary rotates, this process is continuously repeated.

During the winter time, the fresh air conditioning system heats up and humidifying the fresh airflow, and the first end of the first cooling device generates heat. The temperature of the fresh airflow from the first space is increased after the fresh airflow conducts heat exchange with the first end of the first cooling device. Then the fresh airflow flows to the first section of the dehumidifying rotary. In this case, the first section of the dehumidifying rotary is the regenerating zone. The heated fresh airflow absorbs moisture contained within the dehumidifying rotary becomes wet and then flows into the second space. The intended purposes of warming up and humidifying the fresh airflow are then achieved. The second end of the first cooling device refrigerates, the first heat exchanger conducts heat exchange via the fourth conduit. The temperature of the return airflow drops after the return airflow conducts heat exchange with the first heat exchanger, and then flows to the second section of the dehumidifying rotary. In this case, the second section of the dehumidifying rotary is the processing zone. The temperature of the return airflow closes to the dew point after it is cooled down and the moisture carried by the return airflow is absorbed by the dehumidifying rotary, and the return airflow is blown out. After the second section of the dehumidifying rotary absorbs moisture, the moisture-absorbing material contains abundant moisture. When the dehumidifying rotary rotates to the first section, moisture contained therein is transferred to the heated fresh airflow. As long as the dehumidifying rotary rotates, this process is continuously repeated.

Further, the fresh air conditioning system further comprising:

a second cooling device including a second cooling end and a second heating end, wherein the second cooling end is connected to the first section of the dehumidifying rotary, and after flowing through the first section of the dehumidifying rotary, the fresh airflow from the first space conducts heat exchange with the second cooling end of the second cooling device, and then flows to the second space; preferably, the second cooling end of the second cooling device comprising thermal conductive material configured to conduct heat exchange with fresh airflow; further preferably, the thermal conductive material being a thermal conductive aluminum sheet;

a second heat exchanger connected to the first end of the first cooling device and the second heating end of the second cooling device and the first section of the dehumidifying rotary, the fresh airflow from the first space flows to the first section of the dehumidifying rotary after the fresh airflow completes heat exchange with the first end of the first cooling device and then with the second heat exchanger;

a second energy switching device connected to the second heating end of the second cooling device, the first heat exchanger and the second heat exchanger and configured to selectively transfer energy from the second heating end of the second cooling device to the first heat exchanger or the second heat exchanger.

Preferably, the fresh air conditioning system made in accordance with the present invention further comprises one or more additional cooling devices, heat exchangers and energy switching devices.

The second cooling end of the second cooling device is capable of re-cooling the fresh airflow after the fresh airflow passes through the first section of the dehumidifying rotary, and further regulate the temperature of the fresh airflow, and the second heating end of the second cooling device can supply heat for the first heat exchanger or the second heat exchanger via the second energy switching device, which further enhances the processing capacity of the fresh air conditioning system.

Further, the first heat exchanger includes a ventilated plenum chamber and/or the second heat exchanger includes a ventilated plenum chamber. The ventilated plenum chamber is a three-pass configuration including a primary airway and an auxiliary airway. The primary airway is used for the fresh airflow or the return airflow, while the auxiliary airway is for influx of heat exchanged airflow from the first cooling device or the second cooling device. The heat exchanged airflow conducts heat exchange with the fresh airflow or the return airflow within the primary airway.

Further, the second energy switching device includes a sixth conduit which is interconnected between the second heating end of the second cooling device and the second heat exchanger and is equipped with a sixth valve, and a seventh conduit which is interconnected between the second heating end of the second cooling device and the first heat exchanger, and is equipped with a seventh valve.

Further, the fresh air conditioning system further comprises:

a first blower connected to the second cooling end of the second cooling device and configured to blow the fresh airflow to the second space after the fresh airflow completes heat exchange with the second cooling end of the second cooling device;

a second blower connected to the second section of the dehumidifying rotary and configured to expel the return airflow from the second section of the dehumidifying rotary;

a heater connected to the second section of the dehumidifying rotary and the first heat exchanger, wherein after the return airflow completes the heat exchange with the first heat exchanger, the return airflow flows through the heater and then to the second section of the dehumidifying rotary; the heater being used to additionally heat the return airflow to prevent a low regeneration rate of the dehumidification rotor caused by insufficient heat in the return airflow, thereby affecting the overall operating efficiency; and a filter connected to the first end of the first cooling device, and wherein the fresh airflow from the first space flows through the filter and then to the first end of the first cooling device.

Further, the first cooling device and/or the second cooling device is a thermoelectric cooler. The thermoelectric cooler has advantages of no noise, no vibration, no refrigerant needed, small size, light weight, etc., and it is reliable, easy to operate, and easy to adjust the cooling capacity.

Further, the first cooling device includes a positive electrode and a negative electrode, wherein when the positive and negative electrodes are supplied with power, the first end of the first cooling device functions as a cooling source, and the second end of the first cooling device functions as a heating source, when the power supplied to the positive and negative electrodes is reversed, the first end of the first cooling device functions as a heating source, and the second end of the first cooling device functions as a cooling source.

By providing the above-described technology, the present invention can be concluded with at least the following advantages.

The fresh air conditioning system made in accordance with the present invention can readily achieve its intended purposes of cool down and dehumidifying during the summer time, and warm up and humidifying during the winter time by providing a first cooling device, a dehumidifying rotary, an airflow switching device, a first heat exchanger and a second heat exchanger without incorporating with additional humidifier. Energy from both ends can be effectively utilized to conserve energy.

Figure 1:
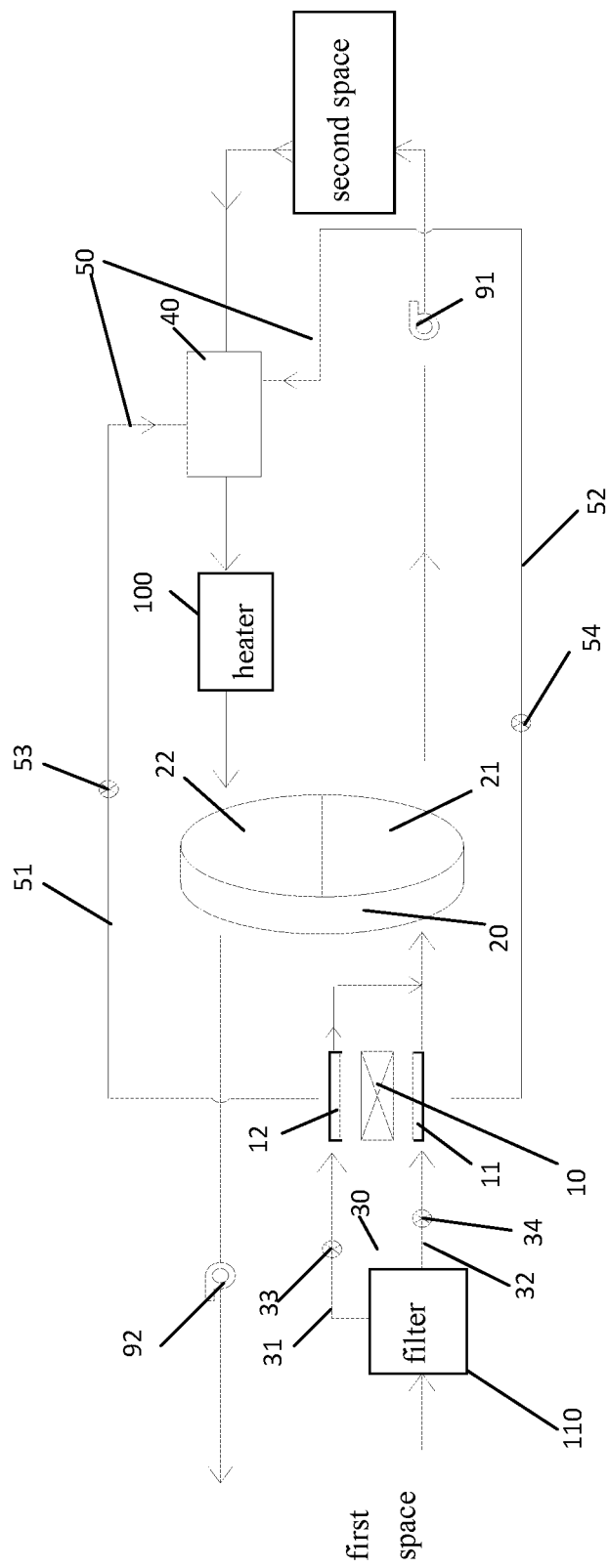
FIG. 1 is a configurational illustration of a fresh air conditioning system in accordance with a first embodiment of the present invention.

In Figs., First cooling device 10, first cooling end 11, first heating end 12, first end 13, second end 14

Dehumidifying rotary 20, first section 21, second section 22

Air flow switching device 30, first conduit 31, second conduit 32, first valve 33, second valve 34

First heat exchanger 40

First energy switching device 50, fourth conduit 51, fifth conduit 52, fourth valve 53, fifth valve 54

Second cooling device 60, second cooling end 61, second heating end 62

Second heat exchanger 70, third conduit 71, third valve 72

Second heat switching device 80, sixth conduit 81, seventh conduit 82, sixth valve 83, seventh valve 84

First blower 91, second blower 92

Heater 100

Filter 110

DETAILED DESCRIPTION OF PREFERRED EMBODIMENTS OF THE INVENTION

For more clearly illustrating the present invention, the following provides a more complete description of the present invention with reference to related drawings and preferred embodiments. In addition, new embodiments can be derived and embodied through a combination of different embodiments or techniques disclosed therein.

Embodiment 1

Referring to FIG. 1, a fresh air conditioning system made in accordance with a first embodiment of the invention includes a first cooling device 10, a dehumidifying rotary 20, an airflow switching device 30, a first heat exchanger 40 and a first energy switching device 50.

The first cooling device 10 can be a thermoelectric cooler, and includes a first cooling end 11, and a first heating end 12.

The dehumidifying rotary 20 defines a first section 21 and a second section 22. When the first section 21 of the dehumidifying rotary 20 works as a processing zone, then the second section 22 of the dehumidifying rotary 20 works as a regenerating zone, and when the first section 21 of the dehumidifying rotary 20 works as the regenerating zone, then the second section 22 of the dehumidifying rotary 20 works as the processing zone.

The airflow switching device 30 is connected to the first cooling device 10 and selectively diverting a fresh airflow from a first space to the first cooling end 11 or the first heating end 12 of the first cooling device 10. The first space, for example, is a space of outdoors or a designated space. When the airflow switching device 30 diverts the fresh airflow from the first space to the first cooling end 11 of the first cooling device 10, the fresh airflow from the first space conducts heat exchange with the first cooling end 11 of the first cooling device 10 so as to decrease the temperature of the fresh airflow from the first space. When the airflow switching device 30 diverts the fresh airflow from the first space to the first heating end 12 of the first cooling device 10, the airflow from the first space conducts heat exchange with the first heating end 12 of the first cooling device 10 so as to increase the temperature of the fresh airflow from the first space.

According to one specific embodiment, the airflow switching device 30 includes a first conduit 31 and a second conduit 32. The first conduit 31 is connected to the second heating end 12 of the first cooling device 10, and equipped with a first valve 33, such as a solenoid, to control open-shutoff of the first conduit 31. The second conduit 32 is connected to the first cooling end 11 of the first cooling device 10, and is equipped with a second valve 34, such as a solenoid, to control open-shutoff of the second conduit 32. When the first valve 33 is open, and the second valve 34 is shutoff, then the airflow switching device 30 will divert the fresh airflow from the first space to the first heating end 12 of the first cooling device 10. While when the first valve 33 is shutoff, and the second valve 34 is open, then the airflow switching device 30 will divert the fresh airflow from the first space to the first cooling end 11 of the first cooling device 10. By this arrangement, switch of direction of the fresh airflow can be readily achieved.

In some other embodiments, the airflow switching device 30 can be embodied in other forms, for example, the airflow switching device 30 includes a switching valve connected to the first conduit 31, and the second conduit 32, respectively. The switching valve can guide the fresh airflow to the first conduit 31, or the second conduit 32 so as to switch the airflow.

The first heat exchanger 40 is connected to the second section 22 of the dehumidifying rotary 20 so as to conduct heat exchange with a return airflow from a second space. The first heat exchanger 40 may include a ventilated plenum chamber which includes a three-pass configuration, i.e. a primary airway, and an auxiliary airway. The primary airway is used for the fresh airflow or the return airflow, while the auxiliary airway is a fourth conduit 51 or a fifth conduit 52 for influx of heat exchanged airflow from the first cooling device 10 or the second cooling device 60. The heat exchanged airflow conducts heat exchange with the fresh airflow or the return airflow within the primary airway.

The first energy switching device 50 is arranged between the first cooling device 10 and the first heat exchanger 40 to selectively transfer energy from the first cooling end 11 or the first heating end 12 to the first heat exchanger 40.

The first energy switching device 50 further includes the fourth conduit 51 and the fifth conduit 52. The fourth conduit 51 is arranged between the first heating end 12 of the first cooling device 10 and the first heat exchanger 40. The fourth conduit 51 is equipped with a fourth valve 53, typically a solenoid, to control open-shutoff of the fourth conduit 51. The fifth conduit 52 is arranged between the first cooling end 11 of the first cooling device 10 and the first heat exchanger 40. The fifth conduit 52 is equipped with a fifth valve 54, typically a solenoid, to control open-shutoff of the fifth conduit 52. When the fourth valve 53 is open and the fifth valve 54 is shutoff, the first energy switching device 50 will transfer energy from the first heating end 12 of the first cooling device 10 to the first heat exchanger 40. When the fourth valve 53 is shutoff and the fifth valve 54 is open, the first energy switching device 50 will transfer energy from the first cooling end 11 of the first cooling device 10 to the first heat exchanger 40. By this arrangement, energy from the first cooling end 11 or the first heating end 12 of the first cooling device 10 can be directed to the first heat exchanger 40. In other preferred embodiments, the first energy switching device 50 can be configured with a switching valve and conduits so as to achieve the purpose. It can have a similar configuration of the airflow switching device 30. As a result, no detailed description is given herein.

After the fresh airflow from the first space completes heat exchange with the first cooling end 11 or the first heating end 12 of the first cooling device 10, the fresh airflow flows to the second space through the first section 21 of the dehumidifying rotary 20, and the return airflow will conduct heat exchange with the first heat exchanger 40, and then exhaust through the second section 22 of the dehumidifying rotary 20.

According to the preferred embodiment, the fresh air conditioning system further comprises a first blower 91, a second blower 92, a heater 100 and a filter 110.

The first blower 91 is connected to the first section 21 of the dehumidifying rotary 20 in order to blow out the fresh airflow to the second space.

The second blower 92 is connected to the second section 22 of the dehumidifying rotary 20 in order to discharge the return airflow out from the second section 22 of the dehumidifying rotary 20.

The heater 100 is connected to second section 22 of the dehumidifying rotary 20 and the first heat exchanger 40. After the return airflow from the second space completes heat exchange with the first heat exchanger 40, the return airflow is heated by the heater 100 and then flow to the second section 22 of the dehumidifying rotary 20. The heater 100 is used to warm up the return airflow so as to keep efficiency of the dehumidifying rotary 20 steady, avoid reducing a regenerating/restoring efficiency of the dehumidifying rotary 20 which could reduce the overall efficiency of the fresh air conditioning system.

The filter 110 is connected to the airflow switching device 30. The fresh airflow from the first space is filtered by the filter 110 and then flows to the airflow switching device 30.

Operational procedures of the fresh air conditioning system during the summer and winter time will be disclosed as follow.

It should be noted that since the working principles of dehumidifying and humidifying, the working principle of the present invention has been detailedly given, as a result, no detailed description is given herebelow.

During the summer time, the fresh air conditioning system performs a dehumidifying process and temperature control to the fresh airflow. When the first cooling device 10 starts to operate, the first valve 33 of the airflow switching device 30 is shutoff, while the second valve 34 is open. As a result, the fresh airflow from the first space flows through the second conduit 32 to the first cooling end 11 of the first cooling device 10. Afterward, the fresh airflow flows to the first section 21 of the dehumidifying rotary 20. In this situation, the first section 21 of the dehumidifying rotary 20 is a processing zone to perform dehumidifying and cooling processes. Meanwhile, the fourth valve 53 of the first energy switching device 50 is open, and the fifth valve 54 is shutoff, then energy from the first heating end 12 of the first cooling device 10 is controlled to transfer to the first heat exchanger 40. The temperature of the return airflow from the second space is warm up after completes heat exchange with the first heat exchanger 40, and then flows to the second section 22 of the dehumidifying rotary 20. In this situation, the second section 22 of the dehumidifying rotary 20 is a regenerating zone, and the heated return airflow will take away humidity within the dehumidifying rotary 20, and then exit the system.

During the winter time, the fresh air conditioning system will warm up and humidify the fresh airflow from the first space. In this situation, the first valve 33 is open, the second valve 34 is shutoff, and the airflow from the first space flows to the first heating end 12 of the first cooling device 10. After the fresh airflow completes heat exchange with the first heating end 12 of the first cooling device 10 and warm up, the fresh airflow will flow through the first section 21 of the dehumidifying rotary 20. In this situation, the first section 21 of the dehumidifying rotary 20 functions as a regenerating zone to warm up and humidify the fresh airflow from the first space. The fourth valve 53 of the first energy switching device 50 is shutoff, the fifth valve 54 is open, transferring energy from the first cooling end 11 of the first cooling device 10 to the first heat exchanger 40. After the return airflow from the second space completes heat exchange with the first heat exchange 40 and reduces its temperature, the return airflow flows to the second section 22 of the dehumidifying rotary 20. In this situation, the second section 22 of the dehumidifying rotary 20 functions as a processing zone. The temperature of the return airflow is close to dew point after it is cooling down. After humidity contained within the return airflow is absorbed by the dehumidifying rotary 40, the return airflow exits the system.

During the operation and functioning of the fresh air conditioning system made in accordance with the present invention, while the energy from one end of the first cooling device 10 is effectively utilized by the fresh airflow, the return airflow also effectively utilizes the energy from the other end of the first cooling device 10. As such, energy from both ends of the first cooling device 10 is effectively utilized. By this arrangement, energy is preferably conserved without any unwanted waste.

Embodiment 2

Figure 2:
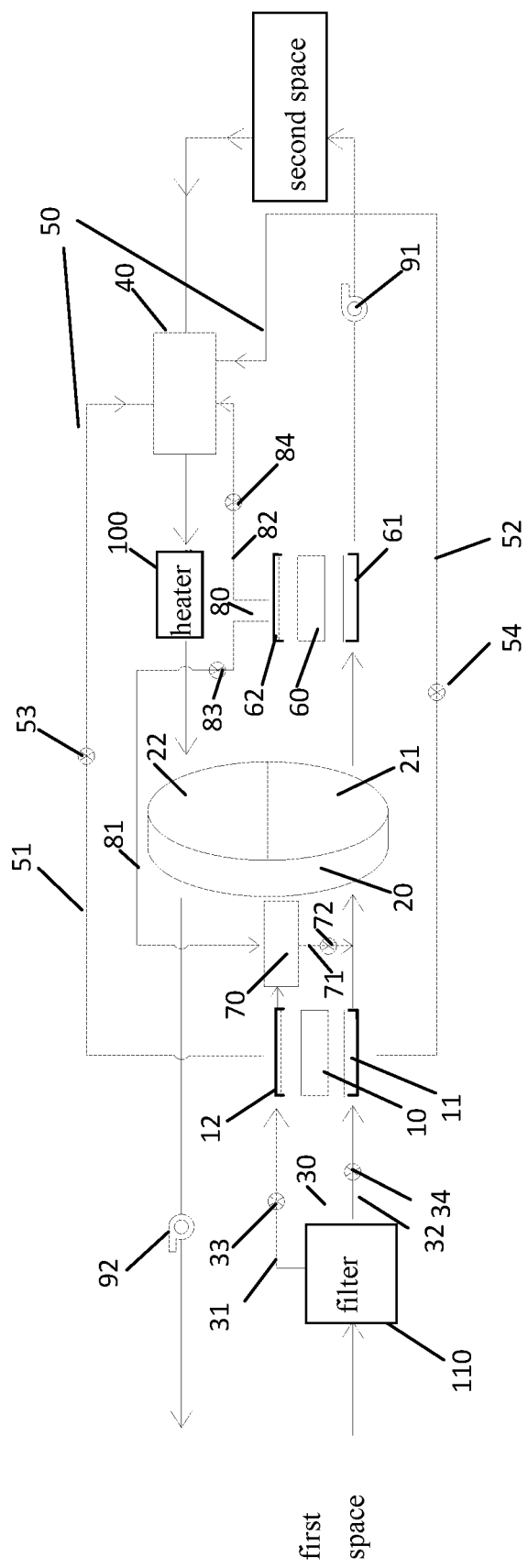
FIG. 2 is a configurational illustration of a fresh air conditioning system in accordance with a second embodiment of the present invention.
Figure 3:
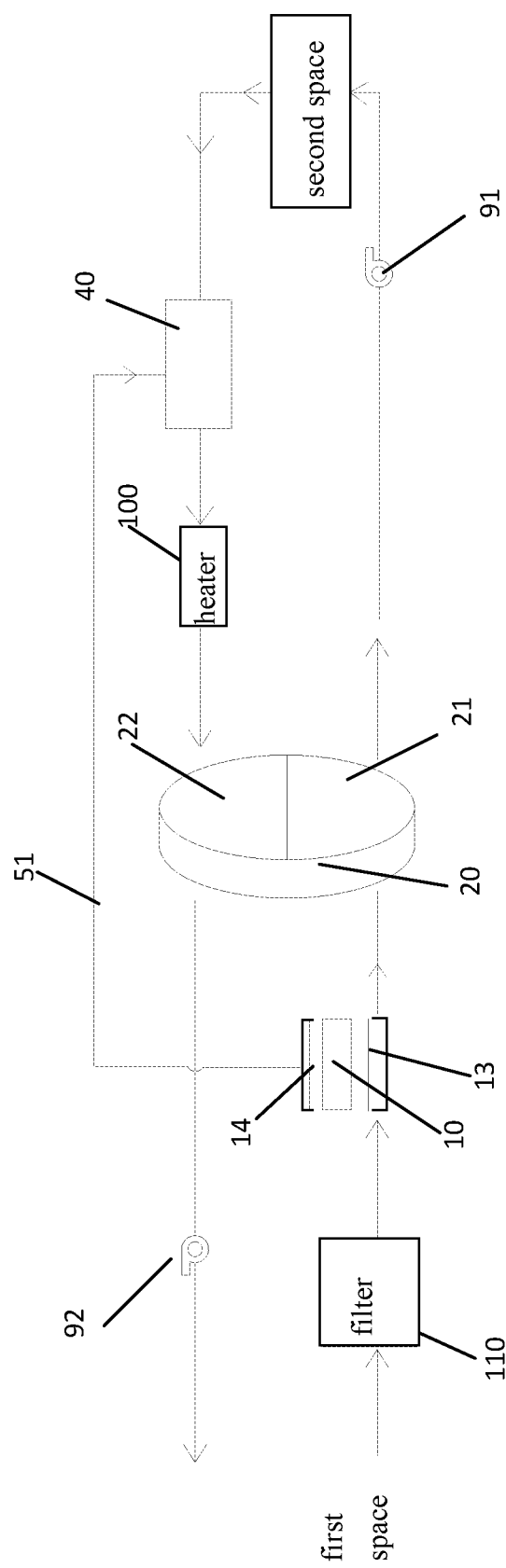
FIG. 3 is a configurational illustration of a fresh air conditioning system in accordance with a third embodiment of the present invention.
Figure 4:
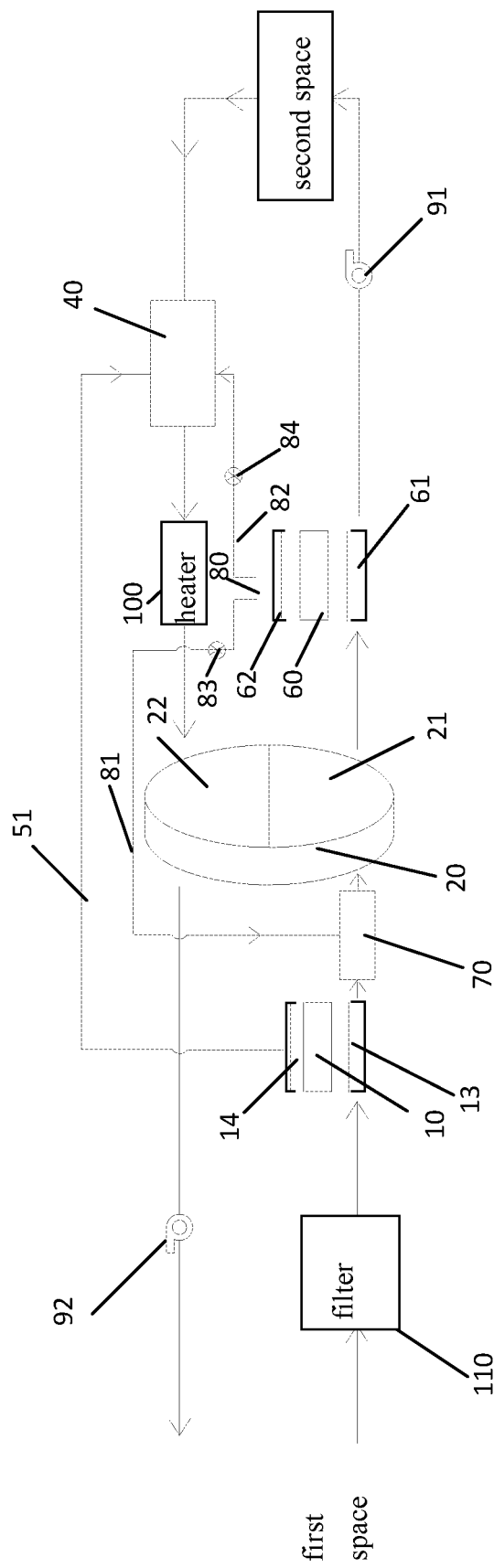
FIG. 4 is a configurational illustration of a fresh air conditioning system in accordance with a fourth embodiment of the present invention.

Referring to FIG. 2, a fresh air conditioning system made in accordance with a second embodiment of the invention, which is based on the first embodiment, further includes a second cooling device 60, a second heat exchanger 70, and a second energy switching device 80.

The second cooling device 60 includes a second cooling end 61 and a second heating end 62. The second cooling end 61 of the second cooling device 60 is connected to the first section 21 of the dehumidifying rotary 20. The fresh airflow from the first space flows first through the first section 21 of the dehumidifying rotary 20, and then conducts heat exchange with the second cooling end 61 of the second cooling device 60. Eventually, the fresh airflow flows to the second space.

The second heat exchanger 70 is connected to the first heating end 12 of the first cooling device 10, the second heating end 62 of the second cooling device 60, and the first section 21 of the dehumidifying rotary 20. After the fresh airflow from the first space conducts heat exchange with the first heating end 12 of the first cooling device 10, and the fresh airflow further conducts heat exchange with the second heat exchanger 70, and then flows to the first section 21 of the dehumidifying rotary 20. The second heat exchanger 70 may include a ventilated plenum chamber. The ventilated plenum chamber is a three-pass configuration including a primary airway and an auxiliary airway. The fresh airflow flows through the primary airway, and the auxiliary airway is a sixth conduit 81 for influx of airflow from the second cooling device 60. The airflow from the second cooling device 60 mixes thoroughly with the fresh airflow or the return airflow and conducts heat exchange with them.

The second energy switching device 80 is connected to the second heating end 62 of the second cooling device 60, the first heat changer 40 and the second heat exchanger 70. The second energy switching device 80 is configured to selectively transfer energy from the second heating end 62 of the second cooling device 60 to the first heat exchanger 40 or the second heat exchanger 70.

The second energy switching device 80 may include a sixth conduit 81 arranged between the second heating end 62 of the second cooling device 60 and the second heat exchanger 70. The sixth conduit 81 is equipped with a sixth valve 83, which can be a solenoid. The second energy switching device 80 further includes a seventh conduit 82 arranged between the second heating end 62 of the second cooling device 60 and the first heat exchanger 40. The seventh conduit 82 is equipped with a seventh valve 84, which is for example a solenoid. When the sixth valve 83 is open, the seventh valve 84 is shutoff, the second energy switching device 80 will transfer energy from the second heating end 62 of the second cooling device 60 to the second heat exchanger 70. When the sixth valve 83 is shutoff, the seventh valve 84 is open, the second energy switching device 80 will transfer energy from the second heating end 62 of the second cooling device 60 to the first heat exchanger 40. By this arrangement, energy from the second heating end 62 of the second cooling device 60 can be selectively transferred to the first heat exchanger 40 or the second heat exchanger 70. In other embodiment, the second energy switching device 80 can be configured with a switching valve and conduits which have identical or similar configuration as the airflow switching device 30. As a result, no detailed description is given herein.

The second heat exchanger 70 is connected to the first section 21 of the dehumidifying rotary 20 through a third conduit 71 which is equipped with a third valve 72, typically a solenoid. The third valve 72 is configured to control the open and shutoff of the third conduit 71.

Operational procedures of the fresh air conditioning system during the summer and winter time will be disclosed as follow.

During the summer time, the fresh air conditioning system will perform temperature control and dehumidifying the fresh airflow. The first cooling device 10 and the second cooling device 60 start to operate, and the first valve 33 is shutoff, the second valve 34 is open, and the third valve 72 is also shutoff. In this case, the fresh airflow from the first space flow to the first cooling end 11 of the first cooling device 10 via the second conduit 32, then flows to the first section 21 of the dehumidifying rotary 20. The fresh airflow keeps flowing to the second cooling end 61 of the second cooling device 60 for secondary cooling. The first section 21 of the dehumidifying rotary 20 serves as a processing zone. Accordingly, the temperature of the fresh airflow is lowered, and the humidity is removed. This is for the summer time. The fourth valve 53 of the first energy switching device 50 is open, the fifth valve 54 is shutoff. With this setting, energy from the first heating end 12 of the first cooling device 10 is directed to the first heat exchanger 40. The sixth valve 83 is shutoff, the seventh valve 84 is open, the first heat exchanger 40 conducts heat exchange with the second heating end 62 of the second cooling device 60 through the conduit 82. The return airflow from the second space is warm up after heat exchange with the first heat exchanger 40. The return airflow passes through the heater 100 and warm up again. The return airflow flows to the second section 22 of the dehumidifying rotary 20. In this setting, the second section 22 of the dehumidifying rotary 20 acts as a regenerating zone, and the return airflow is blown out after the heated return airflow absorbs humidity within the dehumidifying rotary 20.

During the winter time, the fresh air conditioning system will perform temperature control and humidifying the fresh airflow. The first cooling device 10 and the second cooling device 60 start to operate, while the heater 100 can be remained off. The first valve 33 of the airflow switching device 30 is open, the second valve 34 is shutoff, the third valve 72 is open, the sixth valve 83 is open and the seventh valve 84 is shutoff. The energy from the second heating end 62 of the second cooling device 60 is transferred to the second heat exchanger 70 through the sixth conduit 81. The fresh airflow from the first space flows to the first heating end 12 of the first cooling device 10 through the first conduit 31. The fresh airflow keeps flowing to the second heat exchanger 70 for further warm up, and then flows to the first section 21 of the dehumidifying rotary 20 through the third conduit 71. Then the fresh airflow flows to the second cooling end 61 of the second cooling device 60 to cool down. In this setting, the first section 21 of the dehumidifying rotary 20 acts as a processing zone, and the function of temperature control and humidifying the fresh airflow in the winter is realized. The fourth valve 53 of the first heat exchanger 50 is shutoff, the fifth valve 54 is open so as to conduct heat exchange between the first cooling end 11 of the first cooling device 10 and the first heat exchanger 40. The return airflow conducts heat exchange with the first heat exchanger 40 and cools down. The return airflow keeps on flowing to the second section 22 of the dehumidifying rotary 20. In this case, the second section 22 of the dehumidifying rotary 20 acts as a processing zone. The dehumidifying rotary 20 absorbs moisture contained in the return airflow, and then the return airflow is blown out.

During the operation of the fresh air conditioning system made in accordance with the preferred embodiment of the present invention, in dehumidifying the fresh airflow, the fresh airflow utilizes energy from the first cooling end 11 of the first cooling device 10, and energy from the second end 61 of the second cooling device 60, while the return airflow utilizes energy from the second heating end 12 of the first cooling device 10 and energy from the second heating end 62 of the second cooling device 60. In humidifying the fresh airflow, the fresh airflow utilizes energy from the first heating end 12 of the first cooling device 10, and energy from the second heating end 62 from the second cooling device 60. After the fresh airflow passes through the dehumidifying rotary 20, the fresh airflow utilizes energy from the second cooling end 61 of the second cooling device 60 to cool down, while the return airflow utilizes energy from the first cooling end 11 of the first cooling device 10. By this arrangement, energy from both ends of the first cooling device 10 and the second cooling device 60 has been effectively utilized, avoid waste of energy while conserving precious energy.

Embodiment 3

A fresh air conditioning system made in accordance with a third embodiment of the invention includes a first cooling device 10, a dehumidifying rotary 20, a first heat exchanger 40 and a fourth conduit 51.

The first cooling device 10 includes a first end 13 and a second end 14. When the first end 13 of the first cooling device 10 functions to cool, then the second end 14 of the first cooling device 10 functions to heat; when the first end 13 of the first cooling device 10 functions to heat, then the second end 14 of the first cooling device 10 functions to cool. Preferably, the first cooling device 10 is made of a thermoelectric cooler. Further preferably, the first cooling device 10 includes a positive electrode and a negative electrode. When the positive and negative electrodes are supplied with power, the first end 13 of the first cooling device 10 functions to cool, and the second end 14 of the first cooling device 10 functions to heat. When the power supplied to the first and second electrodes is reversed, then the first end 13 of the first cooling device 10 functions to heat, and the second end 14 of the first cooling device 10 functions to cool.

The dehumidifying rotary 20 defines a first section 21 and a second section 22. Wherein when the first section 21 of the dehumidifying rotary 20 works as a processing zone, then the second section 22 of the dehumidifying rotary 20 works as a regenerating zone, wherein when the first section 21 of the dehumidifying rotary 20 works as the regenerating zone, then the second section 22 of the dehumidifying rotary 20 works as the processing zone. The processing zone is a zone in which the dehumidifying rotary 20 absorbs moisture, and the regenerating zone is a zone in which the dehumidifying rotary 20 losses moisture.

The first heat exchanger 40 is connected to the section 22 of the dehumidifying rotary 20, and is used to conduct heat exchange with return airflow from the second space. Energy from the second end 14 of the first cooling device 10 is directed to the first heat exchanger 40 through a fourth conduit 51. The first heat exchanger 40 includes a ventilated plenum chamber which is a three-pass configuration which includes a primary airway and an auxiliary airway. The primary airway is used for a passage of the fresh airflow or return airflow and the auxiliary airway is the fourth conduit 51 for introducing of airflow from the first cooling device 10. The heat exchanged airflow from the first cooling device 10 mixes thoroughly with the fresh airflow or return airflow within the primary airway to conduct heat exchange.

The fresh air conditioning system made accordance with the present invention further includes a first blower 91, a second blower 92, a heater 100 and a filter 110. The arrangement and positions of the first blower 91, and the second blower 92, the heater 100, and the filter 110 can be identical or similar to those described in the first embodiment. As a result, no detailed description is given herein.

Operational procedures of the fresh air conditioning system during the summer and winter time will be disclosed as follow.

During the summer time, the fresh air conditioning system will perform temperature control and dehumidifying the fresh airflow. The first end 13 of the first cooling device 10 functions to cool down. The fresh airflow from the first space conducts heat exchange with the first end 13 of the first cooling device 10 after the fresh airflow is filtered by the filter 100. The temperature of the fresh airflow is lowered approximately to dew point, and then flows through the first section 21 of the dehumidifying rotary 20 and then into the second space. In this case, the first section 21 of the dehumidifying rotary 20 acts a processing zone; and the second section 22 of the dehumidifying rotary 20 acts as a regenerating zone. By this arrangement, the fresh airflow is cooled down and dehumidified during the summer time. The second end 14 of the first cooling device 10 functions to heat, and energy therefrom is directed to the first heat exchanger 40 through the fourth conduit 51. The temperature of the return airflow from the second space is warm up after the return airflow conducts heat exchange with the first heat exchanger 40. The return airflow is warm up further by the heater 100, and then flows to the second section 22 of the dehumidifying rotary 20. In this case, the second section 22 of the dehumidifying rotary 20 acts as the regenerating zone, and the return airflow absorbs moisture within the dehumidifying rotary 20 and then is blown out.

During the winter time, the fresh airflow is treated to warm up and humidify with moisture. The first end 13 of the first cooling device 10 functions to heat. The fresh airflow from the first space is warm up after the fresh airflow conducts heat exchange with the first end 13 of the cooling device 10. The fresh airflow then flows to the first section 21 of the dehumidifying rotary 20. In this case, the first section 21 of the dehumidifying rotary 20 acts as a regenerating zone. The heated and humidified fresh airflow flows into the second space. As a result, fresh airflow is warm up and humidified during the winter time. The second end 14 of the cooling device 10 functions to cool, and energy therefrom conducts heat exchange with the first heat exchanger 40 through the fourth conduit 51. In this case, the heater 100 remained off. The return airflow from the second space is cooled down after conducting heat exchange with the first heat exchanger 40, and then flows to the second section 22 of the dehumidifying rotary 20. Here, the second section 22 of the dehumidifying rotary 20 acts as a processing zone. The temperature of the return airflow closes approximately to dew point after the return airflow is cooled down and moisture contained therein is absorbed by the dehumidifying rotary 20. The return airflow is then blown out.

During the operation of the fresh air conditioning system, no matter it functions as dehumidifying or humidifying, while the fresh airflow utilizes energy from the first end 13 of the first cooling device 10, the return airflow utilizes energy from the second end 14 of the first cooling device. As a result, energy from both ends of the first cooling device 10 is effectively utilized for intended purposes. Energy is avoided from wasting, but effectively preserved. Compared to the first embodiment of the fresh air conditioning system, the third embodiment is configurationally simplified, and the conduits can be easily connected and arranged.

Embodiment 4

A fresh air conditioning system made in accordance with a fourth embodiment of the invention, which is based on the first embodiment, further includes a second cooling device 60, a second heat exchanger 70, and a second energy switching device 80.

The second cooling device 60 includes a second cooling end 61 which is connected to the first section 21 of the dehumidifying rotary 20 and a second heating end 62. The fresh airflow from the first space conducts heat exchange with the second cooling end 61 of the second cooling device 60 after the fresh airflow passes through the first section 21 of the dehumidifying rotary 20, and then flows to the second space. Preferably, the second cooling device 60 is a thermoelectric cooling device.

The second heat exchanger 70 is connected to the first end 13 of the first cooling device 10, the second heating end 62 of the second cooling device 60, and the first section 21 of the dehumidifying rotary 20. After the fresh airflow conducts heat exchange with the first end 13 of the first cooling device 10, the fresh airflow further conducts heat exchange with the second heat exchanger 70, after that, the fresh airflow flows to the first section 21 of the dehumidifying rotary 20. The second heat exchanger 70 may include a ventilated plenum chamber. The ventilated plenum chamber is a three-pass configuration including a primary airway and an auxiliary airway. The fresh airflow flows through the primary airway, and the auxiliary airway is a sixth conduit 81 for influx of heat exchanged airflow from the first cooling device 10 or the second cooling device 60. The heat exchanged airflow mixes thoroughly with the fresh airflow and conducts heat exchange with them.

The second energy switch device 80 is connected to the second heating end 62 of the second cooling device 60, the first heat exchanger 40, and the second heat exchanger 70 and is used to selectively direct energy from the second heating end 62 of the second cooling device 60 to the first heat exchanger 40 or the second heat exchanger 70. The second energy switching device 80 includes the sixth conduit 81 and a seventh conduit 82. The sixth conduit 81 is arranged between the second heating end 62 of the second cooling device 60, and the second heat exchanger 70. The sixth conduit 81 is equipped with a sixth valve 83. The seventh conduit 82 is arranged between the second heating end 62 of the second cooling device 60 and the first heat exchanger 40. The seventh conduit 82 is equipped with a seventh valve 84. The second energy switching device 80 of this embodiment can be identical or similar to the second energy switching device 80 of the second embodiment. Thus, no detailed description is given herein.

The fresh air conditioning system made in accordance with the present invention further includes a first blower 91, a second blower 92, a heater 100, and a filter 110. The filter 110 is connected to the first end 13 of the first cooling device 10. The arrangements and the positions of the first blower 91, the second blower 92, the heater 100 and the filter 110 are similar or identical to the second embodiment. As a result, no detailed description is given herein.

Operational procedures of the fresh air conditioning system during the summer and winter time will be disclosed as follow.

During the summer time, the fresh air conditioning system will perform temperature control and dehumidifying the fresh airflow. The first end 13 of the first cooling device 10 functions to cool, the temperature of the fresh airflow from the first space is lowered after the fresh airflow from the first space conducts heat exchange with the first end 13 of the first cooling device 10. The temperature of the fresh airflow is close to the dew point. Then the fresh airflow flows to the first section 21 of the dehumidifying rotary 20. In this case, the first section 21 of the dehumidifying rotary 20 acts as the processing zone. As a result, the fresh airflow becomes drier and then conducts heat exchange with the second cooling end 61 of the second cooling device 60, and then flows to the second space. As a result, the intended purpose of the present invention for the summer time, providing cool and drier fresh airflow is achieved. The second end 14 of the first cooling device 10 heats up, and energy from the second end 14 of the first cooling device 10 is directed to the first heat exchanger 40. The sixth valve 83 of the second energy switching device 80 is shutoff, and the seventh valve 84 is open, and energy from the second heating end 62 of the second cooling device 60 is transferred to the first heat exchanger 40 through the seventh conduit 82. The temperature of the return airflow from the second space is warm up, and then flows to the second section 22 of the dehumidifying rotary 20. In this case, the second section 22 of the dehumidifying rotary 20 acts as the regenerating zone, and the heated return airflow absorbs moisture within the dehumidifying rotary 20, and then is blown out.

During the winter time, the fresh airflow will perform temperature control and humidifying the fresh airflow. The first end 13 of the first cooling device 10 heats up, the sixth valve 83 of the second energy switching device 60 open, the seventh valve 84 is shutoff, energy from the second heating end 62 of the second cooling device 60 will be transferred to the second heat exchanger 70 through the sixth conduit 81. The fresh airflow conducts heat exchange with the first end 13 of the first cooling device 10 which warms the fresh airflow. Afterward, the fresh airflow is warmed again when it conducts heat exchange with the second heat exchanger 70. Then the fresh airflow flows to the first section 21 of the dehumidifying rotary 20. In this case, the first section 21 of the dehumidifying rotary 20 acts as the regenerating zone, and the moisture contained therein is absorbed by the heated fresh airflow. Now, the heated and wetted fresh airflow flows to the second cooling end 61 of the second cooling device 60, conducting heat exchange therewith, and eventually enters the second space. By this arrangement, the intended purposes for the winter time, heating and wetting, are properly achieved. The second 14 of the first cooling device 10 cools, and conducts heat exchange with the first heat exchanger 40 through the fourth conduit 51. The temperature of the return airflow from the second space is cooled down after the return airflow conducts heat exchange with the heat exchanger 40, and the return airflow keeps flowing to the second section 22 of the dehumidifying rotary 20. In this case, the second section 22 of the dehumidifying rotary 20 acts as the processing zone, and the temperature of the return airflow drops to the dew point. The humidity contained in the return airflow is absorbed by the dehumidifying rotary 20, and then the return airflow exits the system.

During the operation of the fresh air conditioning system made in accordance with the fourth embodiment of the present invention, in the dehumidifying process, the fresh airflow utilizes both energy from the first end 13 of the first cooling device 10, and the second cooling end 61 of the second cooling device 60; while the return airflow utilizes energy from the second end 14 of the first cooling device 10, and the second heating end 62 of the second cooling device 60. During humidifying, the fresh airflow utilizes energy from the first end 13 of the first cooling device 10 and the second heating end 62 of the second cooling device 60. After the fresh airflow flows through the dehumidifying rotary 20, the temperature of the fresh airflow is cooled down after the fresh airflow conducts heat exchange with the second cooling end 61 of the second cooling device 60. While the return airflow utilizes energy from the second end 14 of the first cooling device 10. By this arrangement, energy from both ends of the first cooling device 10 and the second cooling device 60 has been effectively utilized. Energy is properly conserved without waste. Compared to the second embodiment of the present invention, the fourth embodiment is more concise and simple, the arrangements and connections of the conduits are simplified.

In conclusion, the fresh air conditioning system properly achieves its intended purposes, i.e. cooling down temperature and dehumidifying the fresh airflow during the summer time, while warm up temperature and humidifying the fresh airflow during the winter time, with simplified configuration without equipping the bubble humidifier. This multi-functional fresh air conditioning system has robust adaptability, effectively utilizes energy from both ends of the cooling device, conserving energy without wasting of them.

It should be understood that even the fresh air conditioning system is illustrated with different embodiments, however, those embodiments are merely illustrative, instead of limiting its embodiments. Any skilled in the art can readily reach to new and different embodiments by modifications, alternations, replacements and remodel of those illustrative embodiments, while those new and different embodiments are all covered by the attached claims.

The invention claimed is:

1. A fresh air conditioning system, comprising
a first cooling device, including a first cooling end and a first heating end;
a dehumidifying rotary defining a first section and a second section, wherein when the first section works as a processing zone, then the second section works as a regenerating zone, wherein when the first section works as the regenerating zone, then the second section works as the processing zone;
an airflow switching device connected to the first cooling device and configured to selectively direct a fresh airflow from a first space to the first cooling end or the first heating end of the first cooling device;
a first heat exchanger connected to the second section of the dehumidifying rotary and configured to conduct a heat exchange with a return airflow from a second space;
a first energy switching device connected to the first cooling device and the first heat exchanger and configured to selectively transfer energy from the first cooling end or the first heating end to the first heat exchanger;
a second cooling device including a second cooling end and a second heating end, wherein the second cooling end is connected to the first section of the dehumidifying rotary, and after flowing through the first section of the dehumidifying rotary, the fresh airflow from the first space conducts heat exchange with the second cooling end of the second cooling device, and then flows to the second space;
a second heat exchanger connected to the first heating end of the first cooling device and the second heating end of the second cooling device and the first section of the dehumidifying rotary, wherein the fresh airflow from the first space flows to the first section of the dehumidifying rotary after the fresh airflow completes heat exchange with the first heating end of the first cooling device and then with the second heat exchanger; and
a second energy switching device connected to the second heating end of the second cooling device, the first heat exchanger and the second heat exchanger to selectively transfer energy from the second heating end of the second cooling device to the first heat exchanger or the second heat exchanger;

wherein the fresh airflow from the first space conducts heat exchange with the first cooling end or the first heating end of the first cooling device and then flows through the first section of the dehumidifying rotary to the second space, and the return airflow from the second space conducts a heat exchange with the first heat exchanger and then flows out through the second section of the dehumidifying rotary.

2. The fresh air conditioning system as recited in claim 1, wherein the first heat exchanger includes a ventilated plenum chamber and/or the second heat exchanger includes a ventilated plenum chamber.

3. The fresh air conditioning system as recited in claim 1, wherein the second energy switching device includes a conduit which is interconnected between the second heating end of the second cooling device and the second heat exchanger and is equipped with a valve, and another conduit which is interconnected between the second heating end of the second cooling device and the first heat exchanger and is equipped with another valve;

wherein the second heat exchanger is connected to the first section of the dehumidifying rotary with another conduit which is equipped with another valve.

4. The fresh air conditioning system as recited in claim 1, wherein the fresh air conditioning system further comprises:

a first blower connected to the second cooling end of the second cooling device and configured to blow the fresh air to the second space after the fresh air completes heat exchange with the second cooling end of the second cooling device;

a second blower connected to the second section of the dehumidifying rotary and configured to expel the return airflow out from the second section of the dehumidifying rotary;

a heater connected to the second section of the dehumidifying rotary and the first heat exchanger, after the return airflow from the second space completes the heat exchange with the first heat exchanger, the return airflow flows through the heater and then to the second section of the dehumidifying rotary; and a filter connected to the airflow switching device, the fresh air from the first space flowing through the filter and then to the airflow switching device.

5. The fresh air conditioning system as recited in claim 1, wherein the first cooling device and/or the second cooling device is a thermoelectric cooler.

6. The fresh air conditioning device as recited in claim 1, wherein the airflow switching device includes a first conduit connected to the first heating end of the first cooling device and equipped with a first valve, and a second conduit connected to the first cooling end of the first cooling device and equipped with a second valve.

7. The fresh air conditioning device as recited in claim 1, wherein the first energy switching device includes a conduit which is interconnected the first heating end of the first cooling device and the first heat exchanger and is equipped with a valve, and another conduit which is interconnected the first cooling end of the first cooling device and the first heat exchanger and is equipped with another valve.

8. A fresh air conditioning system, comprising:

a first cooling device including a first end and a second end, wherein when the first end works to cool, the second end works to heat, and wherein then the first end works to heat, the second end works to cool;

a dehumidifying rotary including a first section and a second section, wherein when the first section works as a processing zone, the second section works as a regenerating zone, and when the first section works as a regenerating zone, the second section works as a processing zone;

a first heat exchanger and a conduit, wherein the first heat exchanger is connected to a second section of the dehumidifying rotary and configured to conduct heat exchange with a return airflow from a second space, and heat of the second end of the first cooling device is transferred to the first heat exchanger via the conduit;

a second cooling device including a second cooling end and a second heating end, wherein the second cooling end is connected to the first section of the dehumidifying rotary, and after flowing through the first section of the dehumidifying rotary, the fresh airflow from the first space conducts heat exchange with the second cooling end of the second cooling device, and then flows to the second space;

a second heat exchanger connected to the first end of the first cooling device and the second heating end of the second cooling device and the first section of the dehumidifying rotary, the fresh airflow from the first space flows to the first section of the dehumidifying rotary after the fresh airflow completes heat exchange with the first end of the first cooling device and then with the second heat exchanger;

a second energy switching device connected to the second heating end of the second cooling device, the first heat exchanger and the second heat exchanger and configured to selectively transfer energy from the second heating end of the second cooling device to the first heat exchanger or the second heat exchanger;

wherein fresh airflow from a first space flows to the second space through the first section of the dehumidifying rotary after conducting heat exchange with the first end of the first cooling device, and the return airflow from the second space discharges from the second section of the dehumidifying rotary after conducting heat exchange with the first heat exchanger.

9. The fresh air conditioning system as recited in claim 8, wherein the first heat exchanger includes a ventilated plenum chamber and/or the second heat exchanger includes a ventilated plenum chamber.

10. The fresh air conditioning system as recited in claim 9, wherein the second energy switching device includes a conduit which is interconnected between the second heating end of the second cooling device and the second heat exchanger and is equipped with a valve, and another conduit which is interconnected between the second heating end of the second cooling device and the first heat exchanger, and is equipped with another valve.

11. The fresh air conditioning system as recited in claim 8, wherein the fresh air conditioning system further comprises:

a first blower connected to the second cooling end of the second cooling device and configured to blow the fresh airflow to the second space after the fresh airflow completes heat exchange with the second cooling end of the second cooling device;

a second blower connected to the second section of the dehumidifying rotary and configured to expel the return airflow from the second section of the dehumidifying rotary;

a heater connected to the second section of the dehumidifying rotary and the first heat exchanger, wherein after the return airflow completes the heat exchange with the first heat exchanger, the return airflow flows through the heater and then to the second section of the dehumidifying rotary; and a filter connected to the first end of the first cooling device, and wherein the fresh airflow from the first space flows through the filter and then to the first end of the first cooling device.

12. The fresh air conditioning system as recited in claim 8, wherein the first cooling device and/or the second cooling device is a thermoelectric cooler.

13. The fresh air conditioning system as recited in claim 12, wherein the first cooling device includes a positive electrode and a negative electrode, wherein when the positive and negative electrodes are supplied with power, the first end of the first cooling device functions as a cooling source, and the second end of the first cooling device functions as a heating source, when the power supplied to the positive and negative electrodes is reversed, the first end of the first cooling device functions as a heating source, and the second end of the first cooling device functions as a cooling source.

* * * * *